US012673735B2

(12) United States Patent
Raju et al.

(10) Patent No.: US 12,673,735 B2
(45) Date of Patent: Jul. 7, 2026

(54) AIRFLOW DEFLECTOR FOR VEHICLE SENSOR

(71) Applicant: GM GLOBAL TECHNOLOGY OPERATIONS LLC, Detroit, MI (US)

(72) Inventors: Kothamasi Sumithra Raju, Bangalore (IN); Yuchuan Liu, Troy, MI (US); Julien P. Mourou, Bloomfield Hills, MI (US); Pooyan Razi, New Hudson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 332 days.

(21) Appl. No.: 18/491,586

(22) Filed: Oct. 20, 2023

(65) Prior Publication Data

US 2025/0128773 A1 Apr. 24, 2025

(51) Int. Cl.
*B62D 35/00* (2006.01)
*B60R 11/04* (2006.01)

(52) U.S. Cl.
CPC ............ *B62D 35/008* (2013.01); *B60R 11/04* (2013.01)

(58) Field of Classification Search
CPC .............................. B62D 35/008; B60R 11/04
See application file for complete search history.

(56) References Cited

U.S. PATENT DOCUMENTS 3,653,709 A * 4/1972 Gravett ................ B60Q 1/0005
296/208
4,174,083 A * 11/1979 Mohn .................... B64D 33/02
137/15.1
4,538,851 A * 9/1985 Taylor ...................... B60R 1/06
296/180.1
9,126,546 B2 * 9/2015 Bochenek ............ B62D 35/007
11,634,087 B1 * 4/2023 MacGregor ............ H04N 23/52
348/373
12,115,948 B2 * 10/2024 Hamilton .............. G01S 7/4813
12,139,107 B2 * 11/2024 Lundy ...................... B60S 1/56
2011/0073142 A1 * 3/2011 Hattori ................... B60S 1/481
134/198
2012/0242833 A1 * 9/2012 Yamaguchi ............. B60R 11/04
348/148
2018/0091714 A1 * 3/2018 Hendricks ............ G03B 17/565

OTHER PUBLICATIONS

Office Action dated May 23, 2024 from German Patent Office for German Patent No. 102023135683.6; 4pgs.

* cited by examiner

*Primary Examiner* — Jonathan Malikasim

(57) ABSTRACT

A sensor pod configured to be mounted to a vehicle. The sensor pod including: a housing; a sensor mounted to the housing, the sensor oriented such that when the sensor pod is mounted to the vehicle the sensor faces an area rearward of the sensor pod; and an airflow deflector mounted to the housing adjacent to an exterior surface of the sensor, the airflow deflector including a body spaced apart from the housing, the body defining a first airflow passageway through an interior of the body and a second airflow passageway between the body and the housing. The airflow deflector is configured to direct a first layer of airflow through the first airflow passageway such that the first layer of airflow flows generally parallel to the exterior surface of the sensor, and direct a second layer of airflow through the second airflow passageway towards the exterior surface of the sensor.

20 Claims, 3 Drawing Sheets

AIRFLOW DEFLECTOR FOR VEHICLE SENSOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an airflow deflector for a vehicle sensor. Vehicles often include sensors at an exterior thereof, such as sonar sensors, camera sensors, electromagnetic sensors, microwave sensors, etc. The sensors may be configured with various functions for use with pedestrian detection, obstacle detection, parking assist, autonomous driving, etc.

SUMMARY

The present disclosure includes, in various features, a sensor pod configured to be mounted to a vehicle. The sensor pod includes: a housing; a sensor mounted to the housing, the sensor oriented such that when the sensor pod is mounted to the vehicle the sensor faces an area rearward of the sensor pod; and an airflow deflector mounted to the housing adjacent to an exterior surface of the sensor, the airflow deflector including a body spaced apart from the housing, the body defining a first airflow passageway through an interior of the body and a second airflow passageway between the body and the housing. Wherein the airflow deflector is configured to direct a first layer of airflow through the first airflow passageway such that the first layer of airflow flows generally parallel to the exterior surface of the sensor, and direct a second layer of airflow through the second airflow passageway towards the exterior surface of the sensor.

In further features, the sensor includes at least one of a camera sensor, an infrared sensor, a sonar sensor, electromagnetic sensor, and microwave sensor.

In further features, the sensor pod is mounted to an autonomous vehicle, the sensor pod positioned to allow the sensor to monitor passengers entering and exiting the vehicle through a side door of the vehicle that is rearward of the sensor pod.

In further features, the airflow deflector further includes a lip extending from a rear end of the body.

In further features, the lip is angled relative to the body.

In further features, the lip extends from the rear end of the body at an angle of about 45° towards the housing.

In further features, the lip and a surface of the housing adjacent to the exterior surface of the sensor extend at divergent angles.

In further features, the body and the surface of the housing opposite to the body extend at divergent angles.

In further features, the lip extends from an inner surface of the body such that airflow exiting the first airflow passageway flows across an outer surface of the lip.

In further features, the sensor is a first sensor, the sensor pod further including a second sensor that is different from the first sensor.

The present disclosure also includes, in various features, a sensor pod configured to be mounted to a vehicle, the sensor pod including: a housing; a sensor mounted to the housing, the sensor oriented such that when the housing is mounted to the vehicle the sensor faces an area rearward of the sensor pod; and an airflow deflector mounted to the housing adjacent to an exterior surface of the sensor, the airflow deflector including a body and a lip extending from the body at an angle, both the body and the lip are spaced apart from the housing, the body defining a first airflow passageway through the body, and the lip extending from a downstream end of the body such that airflow exiting the first airflow passageway flows over an outer surface of the lip.

In further features, the airflow deflector further defines a second airflow passageway between the body and the housing; and the airflow deflector is configured to direct a first layer of airflow through the first airflow passageway such that the first layer of airflow flows generally parallel to the exterior surface of the sensor, and direct a second layer of airflow through the second airflow passageway towards the exterior surface of the sensor.

In further features, the lip extends from a rear end of the body at an angle of about 45°.

In further features, the lip and a first surface of the housing adjacent to the exterior surface of the sensor extend at divergent angles; and the body and a second surface of the housing opposite to the body extend at divergent angles.

The present disclosure includes, in various features, a vehicle including a sensor pod at an exterior of the vehicle. The sensor pod includes a housing; a sensor mounted to the housing, the sensor oriented to face an area rearward of the sensor pod; and an airflow deflector mounted to the housing adjacent to an exterior surface of the sensor, the airflow deflector including a body and a lip extending from the body at an angle, both the body and the lip are spaced apart from the housing, the body defining a first airflow passageway through the body, and the lip extending from a downstream end of the body such that airflow exiting the first airflow passageway flows over an outer surface of the lip.

In further features, the sensor includes at least one of a camera sensor, an infrared sensor, a sonar sensor, electromagnetic sensor, and microwave sensor.

In further features, the sensor is forward of a side door of the vehicle to allow the sensor to monitor persons entering and exiting the vehicle through the side door.

In further features, the airflow deflector further defines a second airflow passageway between the body and the housing; and the airflow deflector is configured to direct a first layer of airflow through the first airflow passageway such that the first layer of airflow flows generally parallel to the exterior surface of the sensor, and direct a second layer of airflow through the second airflow passageway towards the exterior surface of the sensor.

In further features, the lip extends from a rear end of the body at an angle of about 45°.

In further features, the lip and a first surface of the housing adjacent to the exterior surface of the sensor extend at divergent angles; and the body and a second surface of the housing opposite to the body extend at divergent angles.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
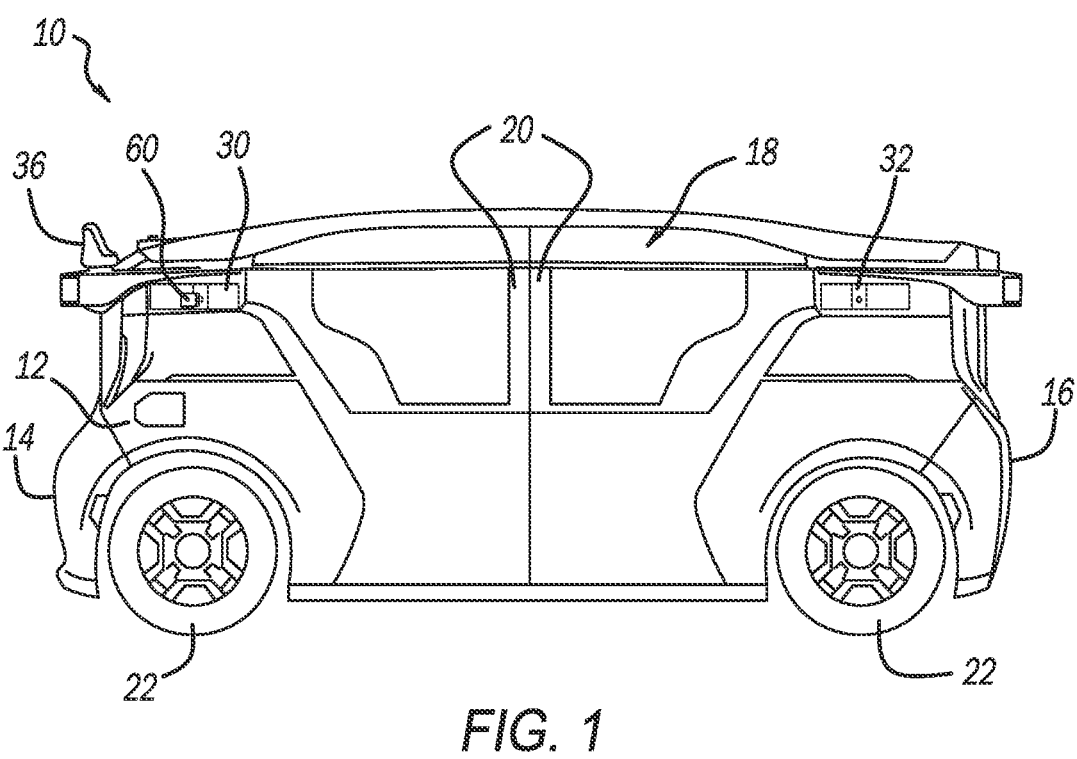
FIG. 1 is a side view of a vehicle with a sensor pod mounted thereto in accordance with the present disclosure.
Figure 2:
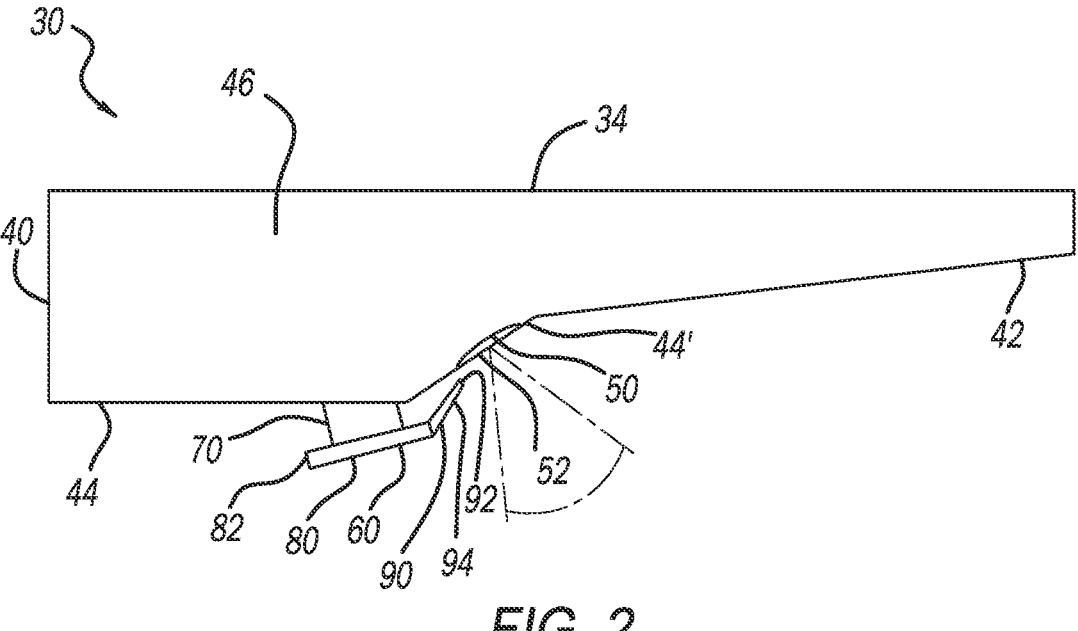
FIG. 2 is a top view of the sensor pod of FIG. 1.
Figures 3, 4:
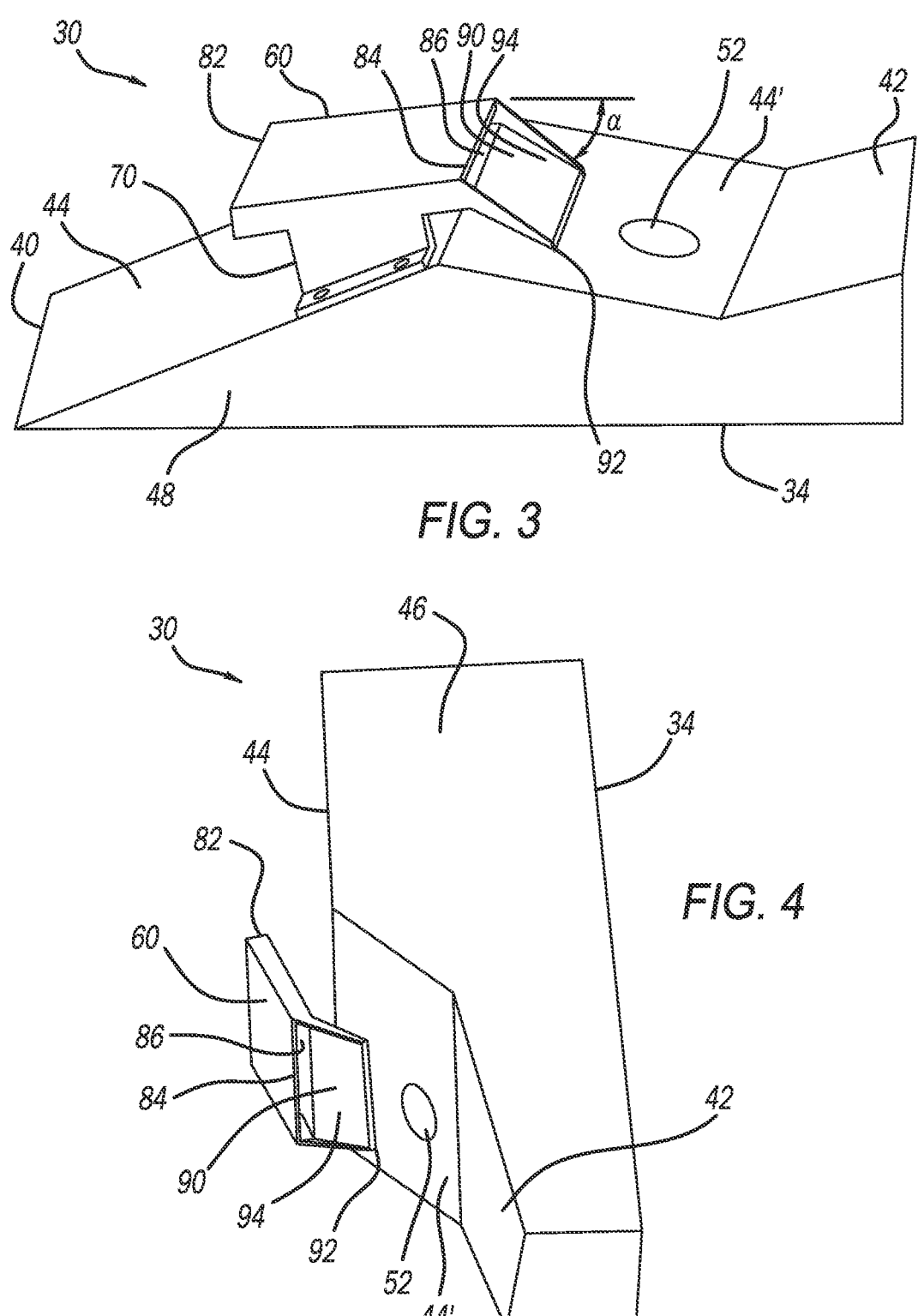
FIG. 3 is a bottom perspective view of the sensor pod.
FIG. 4 is another perspective view of the sensor pod of FIG. 1.

FIG. 1 illustrates an exemplary vehicle 10 including a sensor pod 30 in accordance with the present disclosure. The vehicle 10 generally includes a body 12, a front end 14, a rear end 16, and a side 18. At the side 18 are doors 20. The vehicle 10 may include wheels 22 configured to move the vehicle 10 along any suitable road surface. The wheels 22 may also be configured to move the vehicle 10 along any suitable rails, such as when the vehicle 10 is configured as a rail car. The vehicle 10 may be any suitable vehicle configured in any suitable manner. For example, the vehicle 10 may be configured as a private passenger vehicle, ride-sharing vehicle, mass transit vehicle, rail car, construction vehicle, utility vehicle, etc. The vehicle 10 may also be configured as a watercraft, aircraft, etc. Although the sensor pod 30 is described herein as configured to be mounted to a vehicle, the sensor pod 30 may be configured for use in any suitable non-vehicular applications as well. For example, the sensor pod 30 may be configured for use in any non-vehicular application in which a sensor of the sensor pod 30 faces rearward, or partially rearward, relative to a direction of airflow across the sensor pod.

The vehicle 10 may be configured to be driven by human, as a fully autonomous vehicle, or as a partially autonomous vehicle. In the example of FIG. 1, the vehicle 10 is configured as an autonomous, ride-sharing vehicle. Regardless of the configuration, the vehicle 10 includes the sensor pod 30.

In the example of FIG. 1, the sensor pod 30 is on a front side of the doors 20, and thus configured as a front sensor pod. An optional rear sensor pod 32 is mounted to the vehicle 10 on a rear side of the doors 20. At the front end 14 of the vehicle 10 is a sensor array 36, which may include any suitable sensors (e.g., camera sensors, LiDAR sensors, radar sensors, sonar sensors, etc.) configured to monitor at least areas ahead of the vehicle 10.

With continued reference to FIG. 1, and additional reference to FIGS. 2-6, the front sensor pod 30 will now be described in additional detail. The front sensor pod 30 includes a housing 34 configured to be mounted to the vehicle 10 at the side 18 of the vehicle 10. The housing 34 has a front area 40 and a rear area 42, which is opposite to the front area 40. Between the front area 40 and the rear area 42 is a side surface 44, which is an outer surface. The side surface 44 is between an upper area 46 and a lower area 48. The front sensor pod 30 is configured such that, when mounted to the vehicle 10, the front area 40 faces towards the front end 14 and the rear area 42 faces towards the rear end 16 of the vehicle 10. The side surface 44 generally extends along the side 18 of the vehicle 10.

The front sensor pod 30 includes a sensor 50 housed within, or otherwise mounted to, the housing 34. The sensor 50 may be any sensor suitable for monitoring an area rearward and/or to a side of the front sensor pod 30, which correspond to areas rearward and/or to a side of the vehicle 10 when the front sensor pod 30 is mounted to the vehicle 10. The sensor 50 may include any suitable camera sensor, sonar sensor, LiDAR sensor, electromagnetic sensor, microwave sensor, etc.

The sensor 50 includes an exterior surface 52, which is at a face 44' of the side surface 44 oriented towards an area rearward of, and/or to a side of, the front sensor pod 30. The sensor 50 is thus oriented such that when the front sensor pod 30 is mounted to the vehicle 10, the sensor 50 is in position to monitor the area rearward of the sensor pod 30 and at the side 18 of the vehicle 10. For example, the sensor 50 may be oriented and configured to monitor an area about the doors 20 to identify persons entering and exiting the vehicle 10, as well as any objects that may obstruct movement of the doors 20.

The front sensor pod 30 further includes an airflow deflector 60. The airflow deflector 60 is mounted to the housing 34 adjacent to the exterior surface 52 of the sensor 50. For example, the airflow deflector 60 may be mounted to the side surface 44 of the housing 34. The airflow deflector 60 may be mounted to the housing 34 with any suitable support mount 70. The support mount 70 may be integral with a body 80 of the airflow deflector 60, and attached to the housing 34 with any suitable fastener.

The body 80 of the airflow deflector 60 includes a front end 82 and a rear end 84, which is opposite to the front end 82. The body 80 defines a passageway 86, which extends from the front end 82 to the rear end 84. The passageway 86 allows airflow to flow through the body 80. The body 80 (including the passageway 86 defined thereby) extends at a divergent angle relative to the side surface 44 of the housing 34 (including the face 44').

The airflow deflector 60 further includes a lip 90, which extends from the rear end 84 of the body 80. The lip 90 extends to a distal end 92, which is opposite to the face 44' and is closer to the exterior surface 52 of the sensor 50 than the body 80. The lip 90 extends from an inner surface of the body 80 at the rear end 84 such that airflow exiting the passageway 86 flows across an outer lip surface 94 of the lip 90. The outer lip surface 94 is on a side of the lip 90 opposite to the housing 34. Thus, the outer lip surface 94 faces away from the housing 34. The lip 90 extends from the body 80. The lip 90 may extend from the body 80 at any suitable angle, such as at an angle of 45° or about 45°. The lip 90 and the face 44' extend at divergent angles.

Figures 5, 6:
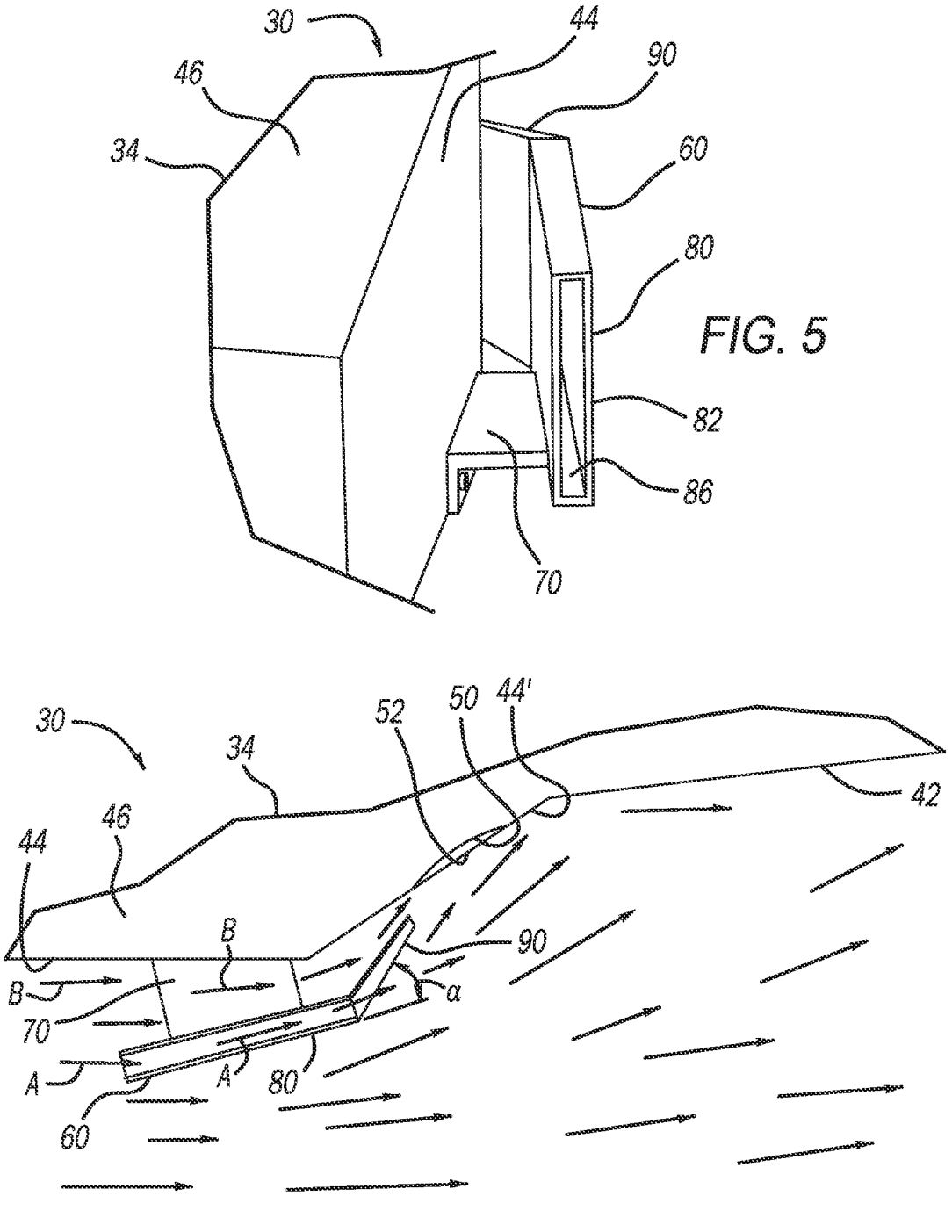
FIG. 5 is an additional perspective view of the sensor pod of FIG. 1.
FIG. 6 is a top view of the sensor pod of FIG. 1 illustrating exemplary airflow across and through an airflow deflector of the sensor pod.

FIG. 6 illustrates exemplary airflow (represented by the arrows pointing from left to right) through and across the airflow deflector 60. The airflow pattern is generated during forward movement of the vehicle 10. A first layer of airflow A flows through the passageway 86 and along the outer lip surface 94. The passageway 86 and the lip 90 are oriented such that the first layer of airflow A flows generally parallel to the face 44' and the exterior surface 52 of the sensor 50. A second layer of airflow B flows between the housing 34 and the airflow deflector 60. Thus, the airflow deflector 60 defines a first airflow passageway through the body 80 by way of passageway 86, and defines a second airflow passageway between the housing 34 and the airflow deflector 60. The second layer of airflow B is directed towards the face 44' and the exterior surface 52 of the sensor 50. The airflow deflector 60 is particularly effective to keep the sensor 50 clean and enhance functionality thereof when the vehicle 10 is moving and air is flowing over and through the airflow deflector 60.

The second layer of airflow B provides enhanced air movement across the exterior surface 52 of the sensor 50 to advantageously reduce buildup of contaminants (such as dirt, dust, etc.) on the exterior surface 52. The first layer of airflow A maximizes the energy of airflow in the area of the exterior surface 52 to avoid formation of low-pressure recirculation regions of airflow, which may disrupt the second layer of airflow B and contribute to buildup of contaminants on the exterior surface 52.

The rear sensor pod 32 includes a sensor, which may be the same as, similar to, or different from the sensor 50. The sensor of the rear sensor pod 32 faces towards the front of the vehicle 10. Because the sensor of the rear sensor pod 32 faces forward, the sensor is more directly exposed to airflow and less likely to experience buildup of contaminants.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A sensor pod configured to be mounted to a vehicle, the sensor pod comprising:

a housing configured to be mounted to a side of the vehicle;

a sensor mounted to the housing, the sensor oriented such that when the sensor pod is mounted to the vehicle the sensor faces an area rearward of the sensor pod; and an airflow deflector mounted to the housing adjacent to an exterior surface of the sensor, the airflow deflector including:

a body spaced apart from the housing, the body defining a first airflow passageway through an interior of the body and a second airflow passageway between the body and the housing; and a lip extending from a rear end of the body towards the sensor, the lip is exterior to the first airflow passageway and is between the rear end of the body and the sensor;

wherein the airflow deflector is configured to direct a first layer of airflow through the first airflow passageway such that the first layer of airflow flows generally parallel to the exterior surface of the sensor, and direct a second layer of airflow through the second airflow passageway towards the exterior surface of the sensor.

2. The sensor pod of claim 1, wherein the sensor includes at least one of a camera sensor, an infrared sensor, a sonar sensor, electromagnetic sensor, and microwave sensor.

3. The sensor pod of claim 1, wherein the sensor pod is mounted to an autonomous vehicle, the sensor pod positioned to allow the sensor to monitor passengers entering and exiting the vehicle through a side door of the vehicle that is rearward of the sensor pod.

4. The sensor pod of claim 1, wherein the lip is angled relative to the body.

5. The sensor pod of claim 1, wherein the lip extends from the rear end of the body at an angle of about 45° towards the housing.

6. The sensor pod of claim 1, wherein the lip and a surface of the housing adjacent to the exterior surface of the sensor extend at divergent angles.

7. The sensor pod of claim 6, wherein the body and the surface of the housing opposite to the body extend at divergent angles.

8. The sensor pod of claim 1, wherein the lip extends from an inner surface of the body such that airflow exiting the first airflow passageway flows across an outer surface of the lip.

9. The sensor pod of claim 1, wherein the sensor is a first sensor, the sensor pod further including a second sensor that is different from the first sensor.

10. A sensor pod configured to be mounted to a vehicle, the sensor pod comprising:

a housing configured to be mounted to a side of the vehicle;

a sensor mounted to the housing, the sensor oriented such that when the housing is mounted to the vehicle the sensor faces an area rearward of the sensor pod; and an airflow deflector mounted to the housing adjacent to an exterior surface of the sensor, the airflow deflector including a body and a lip extending from the body at an angle, both the body and the lip are spaced apart from the housing, the body defining a first airflow passageway through the body, the lip extending from a downstream end of the body towards the sensor, the lip is exterior to the first airflow passageway and is between the downstream end of the body and the sensor such that airflow exiting the first airflow passageway flows over an outer surface of the lip.

11. The sensor pod of claim 10, wherein the airflow deflector further defines a second airflow passageway between the body and the housing; and wherein the airflow deflector is configured to direct a first layer of airflow through the first airflow passageway such that the first layer of airflow flows generally parallel to the exterior surface of the sensor, and direct a second layer of airflow through the second airflow passageway towards the exterior surface of the sensor.

12. The sensor pod of claim 10, wherein the lip extends from a rear end of the body at an angle of about 45°.

13. The sensor pod of claim 10, wherein:

the lip and a first surface of the housing adjacent to the exterior surface of the sensor extend at divergent angles; and the body and a second surface of the housing opposite to the body extend at divergent angles.

14. A vehicle including a sensor pod at an exterior of the vehicle, the sensor pod including:

a housing mounted to a side of the vehicle forward of a side door of the vehicle;

a sensor mounted to the housing, the sensor oriented to face an area rearward of the sensor pod, the area including the side door; and an airflow deflector mounted to the housing adjacent to an exterior surface of the sensor, the airflow deflector including a body and a lip extending from the body at an angle, both the body and the lip are spaced apart from the housing, the body defining a first airflow passageway through the body, the lip extending from a downstream end of the body towards the sensor, the lip is exterior to the first airflow passageway and is between the downstream end of the body and the sensor such that airflow exiting the first airflow passageway flows over an outer surface of the lip.

15. The vehicle of claim 14, wherein the sensor includes at least one of a camera sensor, an infrared sensor, a sonar sensor, electromagnetic sensor, and microwave sensor.

16. The vehicle of claim 14, wherein the sensor is forward of a side door of the vehicle to allow the sensor to monitor persons entering and exiting the vehicle through the side door.

17. The vehicle of claim 14, wherein the airflow deflector further defines a second airflow passageway between the body and the housing; and wherein the airflow deflector is configured to direct a first layer of airflow through the first airflow passageway such that the first layer of airflow flows generally parallel to the exterior surface of the sensor, and direct a second layer of airflow through the second airflow passageway towards the exterior surface of the sensor.

18. The vehicle of claim 14, wherein the lip extends from a rear end of the body at an angle of about 45°.

19. The vehicle of claim 14, wherein:

the lip and a first surface of the housing adjacent to the exterior surface of the sensor extend at divergent angles; and the body and a second surface of the housing opposite to the body extend at divergent angles.

20. The vehicle of claim 14, wherein the first airflow passageway defined by the body is rectangular in cross-section.

\* \* \* \* \*